(12) United States Patent
Takeda et al.

(10) Patent No.: US 7,162,557 B2
(45) Date of Patent: Jan. 9, 2007

(54) COMPETITION ARBITRATION SYSTEM

(75) Inventors: Koichi Takeda, Saitama (JP); Kimito Horie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 140 days.

(21) Appl. No.: 10/121,661

(22) Filed: Apr. 15, 2002

(65) Prior Publication Data

US 2003/0079072 A1    Apr. 24, 2003

(30) Foreign Application Priority Data

Oct. 23, 2001    (JP)    ............................. 2001-325390

(51) Int. Cl.
*G06F 13/14*    (2006.01)
*G06F 13/368*    (2006.01)
*G06F 13/22*    (2006.01)
*G06F 13/00*    (2006.01)

(52) U.S. Cl. ...................... 710/240; 710/107; 710/108; 710/200; 710/220; 710/242

(58) Field of Classification Search .................. 710/45, 710/113, 117, 124, 241, 305, 309, 111, 107, 710/240, 119, 242

See application file for complete search history.

(56) References Cited

U.S. PATENT DOCUMENTS

| | | | | | |
|---|---|---|---|---|---|
| 3,886,524 | A | * | 5/1975 | Appelt | ........................ 710/110 |
| 4,148,011 | A | * | 4/1979 | McLagan et al. | ......... 340/825.5 |
| 4,972,313 | A | * | 11/1990 | Getson et al. | ............... 710/125 |
| 4,987,529 | A | * | 1/1991 | Craft et al. | .................. 710/113 |
| 5,241,629 | A | * | 8/1993 | Barlow et al. | ............... 710/122 |
| 5,367,679 | A | * | 11/1994 | Khaira | ......................... 718/103 |
| 5,392,434 | A | * | 2/1995 | Bryant et al. | ................. 710/244 |
| 5,628,019 | A | * | 5/1997 | O'Brien | ........................ 713/322 |
| 5,787,095 | A | * | 7/1998 | Myers et al. | ................ 714/820 |
| 6,321,284 | B1 | * | 11/2001 | Shinohara et al. | ........... 710/113 |
| 6,362,694 | B1 | * | 3/2002 | Doberenz | ...................... 331/57 |
| 6,389,497 | B1 | * | 5/2002 | Koslawsky et al. | .......... 710/242 |
| 6,684,280 | B1 | * | 1/2004 | Chauvel et al. | .............. 710/244 |

FOREIGN PATENT DOCUMENTS

JP    04-355862    9/1992

(Continued)

OTHER PUBLICATIONS

American Heritage Dictionary of the English Language. Fourth Edition. "logic circuit". Houghton Mifflin Company. 2000. Retrieved from Internet Apr. 6, 2005. <http://dictionary.reference.com/search?r=8&q=logic+circuit>.*

(Continued)

*Primary Examiner*—Mark H. Rinehart
*Assistant Examiner*—Thomas J. Cleary
(74) *Attorney, Agent, or Firm*—Rabin & Berdo P.C.

(57) ABSTRACT

A competition arbitration system in which chances for using a resource of a computer such as a bus or the like among devices are fair is provided. Pulses are sequentially generated periodically from a pulse generating circuit. It is assumed that first device outputted first bus request signal and second device continuously outputted second bus request signal before rising timing of the first pulse. When a bus arbiter outputs a bus grant signal to the first device at the rising timing of the first pulse, the bus master of the first device outputs a bus use acknowledgment signal. Then a use grant inhibiting circuit receives the acknowledgment signal and outputs an inhibition signal for inhibiting use of other devices. Thus, the first device holds the use right of a bus and bus use requests of other devices are reserved.

19 Claims, 7 Drawing Sheets

FOREIGN PATENT DOCUMENTS

JP    06-044182    2/1994

OTHER PUBLICATIONS

Mahmud et al. "A New Arbitration Circuit for Asynchronous Multiple Bus Multiprocessor Systems". Institute of Electrical and Electronics Engineers (IEEE). Apr. 1991. CH 3006-4/91/0000-1041.*

Shin et al. "Round-robin Arbiter Design and Generation". The Association for Computing Machinery (ACM). Sep. 2002. 1-58113-562-9/02/0010.*

"Computer Dictionary". Second Edition. Microsoft Press. 1994. ISBN 1-55615-597-2, pp. 181-182 and 244.*

* cited by examiner

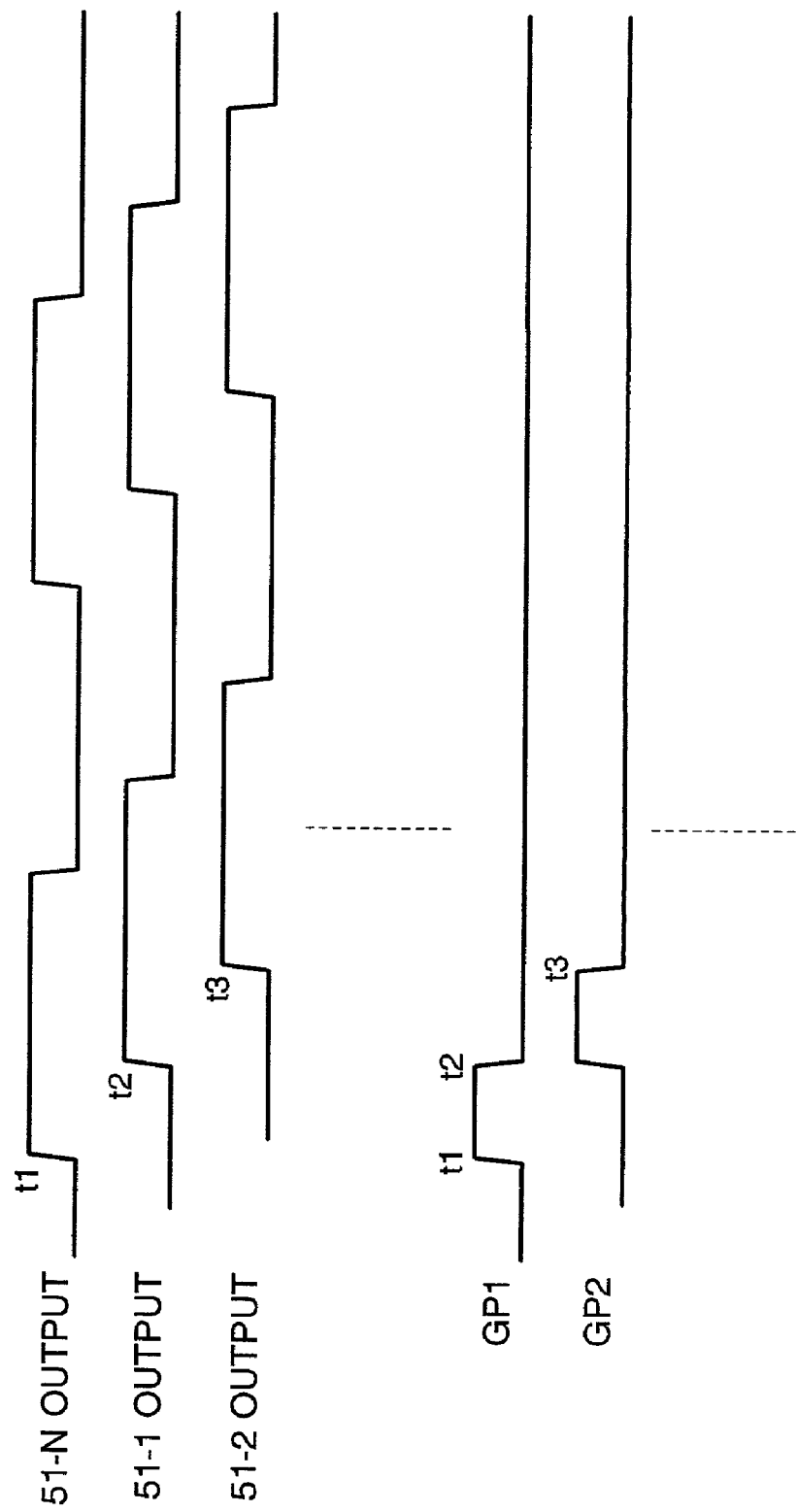

USE GRANT PULSE OUTPUT

COMPETITION OF REQUESTS 1 AND 2

COMPETITION OF REQUESTS 2 AND 3 AFTER END OF REQUEST 1

SYNCHRONOUS REQUEST

COMPETITION ARBITRATION SYSTEM

BACKGROUND OF THE INVENTION

1. Field of the Invention

The invention relates to a competition arbitration system for, when a plurality of requests (use requests) compete, selecting one of the requests at a high speed and, more particularly, to a new competition arbitration system which can be applied to arbitration or the like of buses of a microprocessor.

2. Related Background Art

For example, since a resources in a computer is finite in general, when a plurality of requests compete, there is a case where the user wants to select one of a number of requests in which use of the resource is intended. There are various arbitration systems for arbitrating them. In this case, with respect to selection of a proper arbitration system, trade-offs of a circuit amount, high speed performance, a band width, costs, an electric power consumption, and the like have to be considered.

FIG. 8 is a constructional diagram showing an example of the conventional daisy-chain competition arbitration systems.

The competition arbitration system has a plurality of (N) devices 10-1 to 10-N such as memories or the like as devices to be arbitrated. Bus interfaces 11-1 to 11-N are provided for the devices 10-1 to 10-N, respectively. The bus interfaces 11-1 to 11-N are connected to a bus 15 for transmitting bus data BD. A bus request signal RQ and a bus release signal RL are outputted from each of the devices 10-1 to 10-N and inputted to a bus arbiter 16.

The bus arbiter 16 has a function for managing the bus request signals RQ and bus release signals RL and sending a bus grant signal GR1 to the device 10-1 and is constructed by, for example, a personal computer (hereinafter, abbreviated to "PC") of a host and the like. When the bus grant signal GR1 outputted from the bus arbiter 16 is sent to, for example, the device 10-1, bus grant signals GR2 to GRN are subsequently sequentially transferred in the direction from the device 10-1 to the device 10-N.

In such a competition arbitration system, the devices 10-1 to 10-N compete for a use right of the one bus 15, only one certain device (for example, 10-2) can use the bus 15 via the bus interface 11-2 for a predetermined period of time, and other devices (for example, 10-1, 10-3 to 10-N) are made to wait for the use of the bus. This is because it is necessary to prevent a collision of the bus data BD on the bus 15.

The use right of the bus 15 is shifted by propagation of the bus grant signals GR1 to GRN. With respect to such a situation, it can be presumed that the devices 10-1 to 10-N hold a token and the token is transmitted and received among the devices 10-1 to 10-N. That is, the devices 10-1 to 10-N which request the use grant of the bus 15 preliminarily generate the bus request signal RQ. When one of the devices 10-1 to 10-N obtains the token, it can use the bus 15. For the duration time of yielding the bus 15, even if other devices generate the bus request signals RQ, they are made to wait for the use of the bus 15 until a bus release signal RL is issued.

FIG. 9 is a timing chart showing an example of the operation which is executed when the device 10-2 requests the use of the bus 15 in the daisy-chain competition arbitration system of FIG. 8.

For example, with respect to a bus request signal RQ2 from the device 10-2 which was generated before timing t1, since the device 10-2 receives the token when the bus grant signal GR2 is set to the high level at timing t2, the device 10-2 can assure the use right of the bus 15. Thus, data DA2 can be inputted/outputted to/from the bus 15. In this instance, other devices including the device 10-1 which do not issue the bus request signal RQ cannot use the bus 15 simultaneously with it.

In the daisy-chain arbitration system, the transmission and reception of the token are performed by the propagation of the bus grant signals GR1 to GRN, and the devices 10-1 to 10-N sequentially transfer the token in the direction from the device 10-1 to the device 10-N.

According to the daisy-chain arbitration system, since each of the devices 10-1 to 10-N has one chance of getting the bus grant per period of the propagation of the token, although such a system has the bus arbiter 16, it can be regarded as a distributed arbitration system that is fair to all of the devices 10-1 to 10-N. Since such a system is an arbitration system which can be easily understood, it has widely been spread.

FIG. 10 is a constructional diagram of a distributed competition arbitration system showing an example of the conventional distributed arbitration systems.

As a distributed competition arbitration system, for example, the system NuBus used in MAC made by Apple Computer Co. Ltd. in the U.S.A. has been well-known. The distributed competition arbitration system has a plurality of (N) devices 20-1 to 20-N, and bus interfaces 21-1 to 21-N provided for the devices 20-1 to 20-N are connected to a data bus 25 for transmitting the bus data BD. Further, bus masters 22-1 to 22-N provided for the devices 20-1 to 20-N are connected to a request bus 26.

According to the distributed competition arbitration system, a center bus arbiter like a bus arbiter 16 shown in FIG. 8 is not provided. The bus masters 22-1 to 22-N provided for the devices 20-1 to 20-N compare a value of the signal on the bus with their own priorities with reference to the request bus 26 and discriminates whether the bus request signal RQ is withdrawn or not. The last remaining device (one of the devices 20-1 to 20-N) gets the use right of the data bus 25. Such a system is what is called a self-selection system. The request bus 26 is driven by an open-collector and uses a logic such that the "L" level is preferentially set for the purpose of determining the value of the request bus 26.

The distributed competition arbitration system can use a simple construction because the center bus arbiter is unnecessary. However, since a rather special judging system is used, there are not many systems using it.

However, the conventional competition arbitration system has the following problems (A) and (B).

(A) In the daisy-chain competition arbitration system of FIG. 8, since the token is transmitted and received among the devices 10-1 to 10-N, there is a problem such that a propagation delay is large and the larger the number N of devices 10-1 to 10-N is, the longer the arbitration is delayed. Particularly, since all of the devices 10-1 to 10-N depend on the device whose judging speed is the lowest, the band width is limited, and there is a fear such that a request from the device which needs the high speed arbitration is not satisfied. Thus, a transfer speed of the bus 15 is sacrificed and there is a fear such that input/output devices or the like in which high speed performance is required cannot be established. Although such a system is fair in terms of a chance for arbitration, there is a possibility that the bus 15 is indefinitely occupied by the device of a low priority. In this situation, a request from the device of a high priority cannot be satisfied.

(B) In the distributed competition arbitration system of FIG. 10, since all of the devices 20-1 to 20-N need to compare their own priorities with the value on the request bus 26, there is a problem such that it takes time for decision. Since there is a possibility that the device of the high priority occupies the data bus 25, there is a case where limiting means for preventing such occupation is necessary.

SUMMARY OF THE INVENTION

It is an object of the invention to solve the problems of the prior arts and to provide a high speed competition arbitration system in which chances of getting a bus among devices are fair.

To accomplish the above object, according to the first aspect of the invention, there is provided a competition arbitration system of an arbitration system which is technically novel and cannot be obtained hitherto, wherein the system comprises: N (N is a positive integer of 2 or more) devices using a predetermined resource of a computer; N control means each of which is provided for each of the devices, outputs a use request signal for requesting use of the resource, and outputs a use acknowledgment signal in response to a use grant signal which is sent from an outside on the basis of the use request signal; and a bus arbiter.

The bus arbiter comprises: pulse generating means which sequentially forms N use grant pulses every period at regular pulse intervals and generates them; use grant inhibiting means to which the use acknowledgment signals which are outputted from the N control means are inputted and which outputs an inhibition signal for inhibiting a use grant to the control means of the devices in which the use of the resource is not granted; and N gate circuits which can output the use grant signal to each of the N control means.

Each of the gate circuits of the bus arbiter is constructed in a manner such that the use request signal and use acknowledgment signal which are outputted from each of the control means, each of the use grant pulses which are generated from the pulse generating means, and the inhibition signal which is outputted from the use grant inhibiting means are inputted, respectively, the use grant signal corresponding to the use grant pulse is outputted to the control means of the device in which use of the resource is granted, and the use grant pulse to the control means of the devices in which the use of the resource is not granted is shut off, thereby stopping the output of the use grant signal.

By using such a construction, when the use request signal for requesting the use of the predetermined resource of the computer is outputted from each of the control means provided for the devices, it is sent to the gate circuit in the bus arbiter. The gate circuit sends the use grant signal corresponding to the use grant pulse which is generated from the pulse generating means to the corresponding control means. Thus, since the device is allowed to use the resource, the use acknowledgment signal is outputted from the control means and inputted to the bus arbiter. Since the gate circuits in the bus arbiter corresponding to other devices in which the use of the resource is not granted stop the output of the use grant signal by the inhibition signal which is outputted from the use grant inhibiting means, the use of the resource of the devices in which the use of the resource is not granted is limited.

The competition arbitration system of the first aspect is not merely limited to the arbitration about the use right of the bus but can be also widely applied to, for example, distribution of the resource of the computer.

For example, the competition arbitration system is used for arbitration about the use right of the bus as a predetermined resource of the computer.

In the competition arbitration system, for example, the pulse generating means has a ring oscillator and the use grant pulses are formed by the gate circuits from an output of the ring oscillator.

In the competition arbitration system, each of the control means outputs the use request signal synchronously with the use grant signal, thereby allowing the use requests from the devices to be granted in order of the devices.

By constructing the invention as mentioned above, for example, when the high speed use grant pulses are generated from the pulse generating lot means, the high speed use grant signal corresponding to them is supplied to the control means of each device and the prompt arbitration is performed.

According to the second aspect of the invention, in the competition arbitration system of the first aspect, the control means of each device has a priority determining circuit which determines a priority about the use of the resource of each device.

The priority determining circuit has a first register which stores data indicative of the priority and outputs the use request signal to the bus arbiter on the basis of the data stored in the first register.

The priority determining circuit further has: a counter which receives the data indicative of the priority from the first register and outputs a carry signal according to the data; a request enable register. which outputs a request enable signal in response to the carry signal from the counter; and a second register which outputs the use request signal to the bus arbiter when the request enable register. and the request signal from the device are received.

The control means further has, for example, an occupation canceling circuit which prevents the resource from being occupied by the device.

The occupation cancelling circuit has, for example, a watch dog timer which outputs an abort signal for cancelling the occupation after the elapse of a predetermined time.

The above and other objects and features of the present invention will become apparent from the following detailed description and the appended claims with reference to the accompanying drawings.

BRIEF DESCRIPTION OF THE DRAWINGS

FIG. 4 is a timing chart showing the operation of the circuit in FIG. 2;

DETAILED DESCRIPTION OF THE PREFERRED EMBODIMENTS (First Embodiment)

(1) Construction

Figure 1:
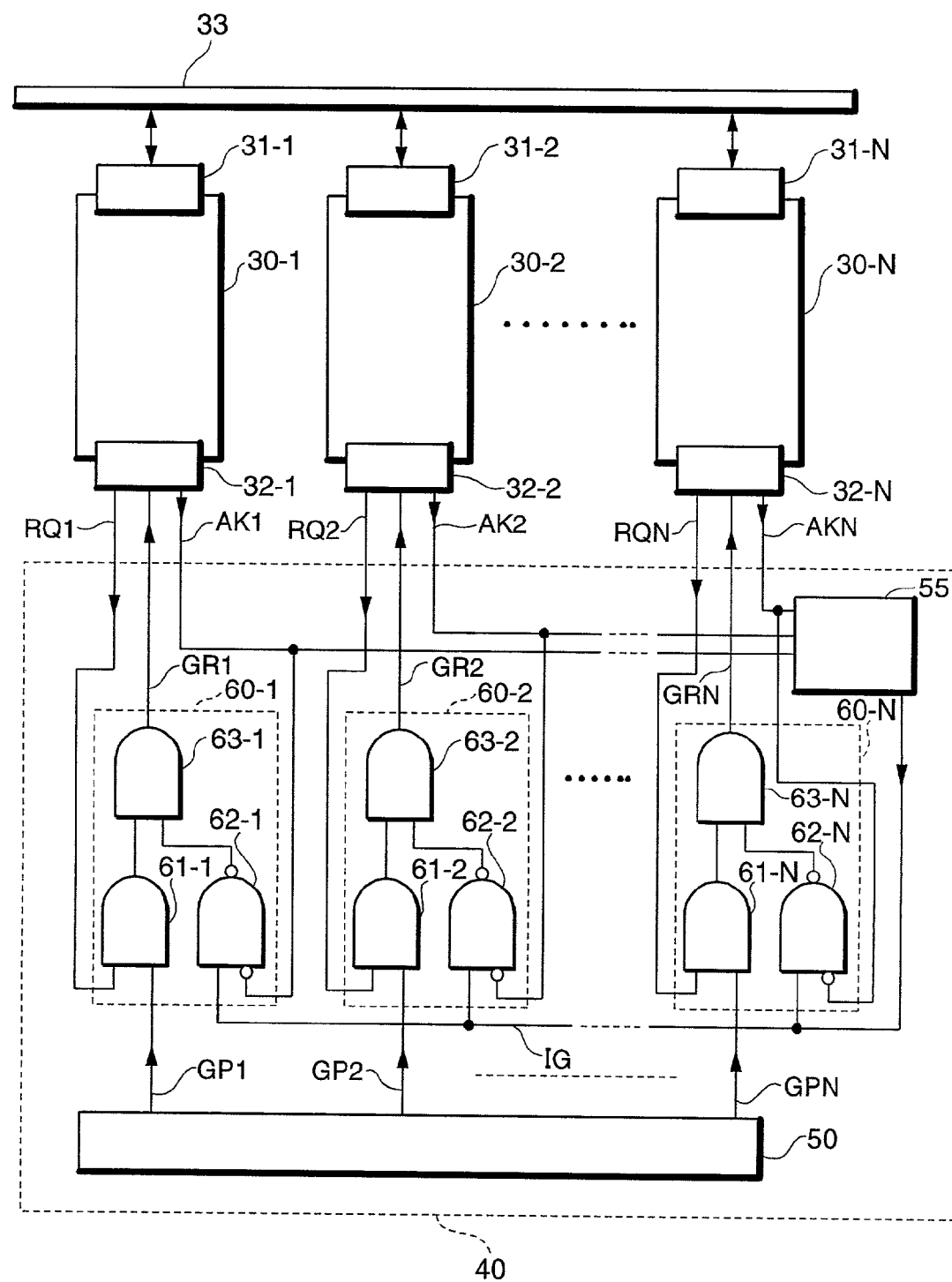
FIG. 1 is a constructional diagram of a competition arbitration system according to the first embodiment of the invention.

FIG. 1 is a constructional diagram of a competition arbitration system according to the first embodiment of the invention.

The competition arbitration system has a plurality of (N) devices 30-1 to 30-N such as memories. The devices 30-1 to 30-N have bus interfaces 31-1 to 31-N and control means (for example, bus masters) 32-1 to 32-N. The bus interfaces 31-1 to 31-N are connected to a predetermined resource (for example, an external bus for transmitting the bus data BD) 33 of a computer. The bus masters 32-1 to 32-N are connected to a bus arbiter 40. Each of the bus interfaces 31-1 to 31-N has a function for inputting and outputting the bus data BD on the external bus 33. The bus masters 32-1 to 32-N have functions for outputting use request signals (for example, bus request signals) RQ1 to RQN and use acknowledgment signals (for example, bus use acknowledgment signals) AK1 to AKN to the bus arbiter 40 and inputting use grant signals (for example, bus grant signals) GR1 to GRN which are outputted from the bus arbiter 40, respectively.

When the devices 30-1 to 30-N request the use of the external bus 33, the bus request signals RQ1 to RQN are outputted from the bus masters 32-1 to 32-N. In the embodiment, the bus request signals RQ1 to RQN continuously exist so long as the bus use acknowledgment signals AK1 to AKN are outputted. When the devices 30-1 to 30-N acknowledge the bus grant signals GR1 to GRN from the bus arbiter 40, the bus use acknowledgment signals AK1 to AKN are outputted from the bus masters 32-1 to 32-N. In the embodiment, the bus use acknowledgment signals AK1 to AKN are withdrawn when the use of the bus by the devices 30-1 to 30-N is finished. When the bus arbiter 40 gives a use right of the external bus 33 to the devices 30-1 to 30-N, the bus grant signals GR1 to GRN are inputted to the bus masters 32-1 to 32-N, so that the devices 30-1 to 30-N obtain the token.

The bus arbiter 40 comprises: pulse generating means (for example, high speed pulse generating circuit) 50; use grant inhibiting means (for example, a use grant inhibiting circuit) 55; and N gate circuits 60-1 to 60-N. The bus arbiter 40 receives the bus request signals RQ1 to RQN and bus use acknowledgment signals AK1 to AKN from the bus masters 32-1 to 32-N and outputs the bus grant signals GR1 to GRN to the bus masters 32-1 to 32-N, respectively.

The high speed pulse generating circuit 50 sequentially forms N high speed use grant pulses GP1 to GPN every period at regular pulse intervals and generates them. The use grant pulses GP1 to GPN become a foundation of the bus grant signals GR1 to GRN. The use grant inhibiting circuit 55 is connected to the bus masters 32-1 to 32-N. The bus use acknowledgment signals AK1 to AKN which are outputted from the bus masters 32-1 to 32-N are inputted to the use grant inhibiting circuit 55. The use grant inhibiting circuit 55 outputs an inhibition signal IG for inhibiting the bus grant signals GR1 to GRN.

The gate circuits 60-1 to 60-N are connected to the high speed pulse generating circuit 50, use grant inhibiting circuit 55, and bus masters 32-1 to 32-N, respectively. The bus request signals RQ1 to RQN and bus use acknowledgment signals AK1 to AKN which are outputted from the bus masters 32-1 to 32-N, the bus grant signals GR1 to GRN which are outputted from the high speed pulse generating circuit 50, and the inhibition signal IG which is outputted from the use grant inhibiting circuit 55 are inputted to the gate circuits 60-1 to 60-N, respectively. The gate circuits 60-1 to 60-N output the bus grant signal GR1 corresponding to the use grant pulse GP1 to the bus master 32-1 of the device (for example, 30-1) in which the use of the external bus 33 is granted. The gate circuits 60-1 to 60-N shut off the use grant pulses GP2 to GPN and stop the output of the bus grant signals GR2 to GRN to the non-grant bus masters 32-2 to 32-N of the devices (for example, 30-2 to 30-N) in which the use of the external bus 33 is not granted.

The gate circuits 60-1 to 60-N comprise: for example, 2-input AND gates 61-1 to 61-N; 2-input NAND gates 62-1 to 62-N; and 2-input AND gates 63-1 to 63-N. The AND gates 61-1 to 61-N are provided for the purpose of receiving the high speed use grant pulses GP1 to GPN and the bus request signals RQ1 to RQN and outputting the bus grant signal GR1 only to the device (for example, 30-1) which requests the use of the external bus 33, respectively. The NAND gates 62-1 to 62-N are provided for the purpose of receiving the inhibition signal IG the bus use acknowledgment signals AK1 to AKN and selectively continuously outputting the bus grant signal GR1 only to the device (for example, 30-1) which is at present using the external bus 33, respectively.

The AND gates 63-1 to 63-N have functions for receiving output signals of the AND gates 61-1 to 61-N and output signals of the NAND gates 62-1 to 62-N, forming the bus grant (or, authorization) signals GR1 to GRN, and selectively outputting them to the corresponding bus masters 32-1 to 32-N, respectively. Therefore, once a certain device (for example, 30-1) occupies the external bus 33, although the bus grant signals GR2 to GRN are not outputted to other devices 30-2 to 30-N, the bus grant signal GR1 is still continuously outputted to the device 30-1. By the operations of the gate circuits 60-1 to 60-N, in the bus arbiter 40, it is guaranteed that the external bus 33 is exclusively used by the devices 30-1 to 30-N. FIG. 1 shows that each gate (logic) circuit 60-1 to 60-N outputs the grant authorization signal (bus grant signal) GR-1 to GR-N when the respective request signal (one of RQ-1 to RQ-N) and the inhibition signal IG from the grant inhibiting circuit 55 have a specific logical truth-value relationship corresponding to the case that the logic circuit is receiving a request signal but is not receiving the inhibition signal IG, because outputting a GR signal requires that the RQ and GP signals be high and the AK and IG signals be low, that is, RQ must be high and IG low.

Figure 2:
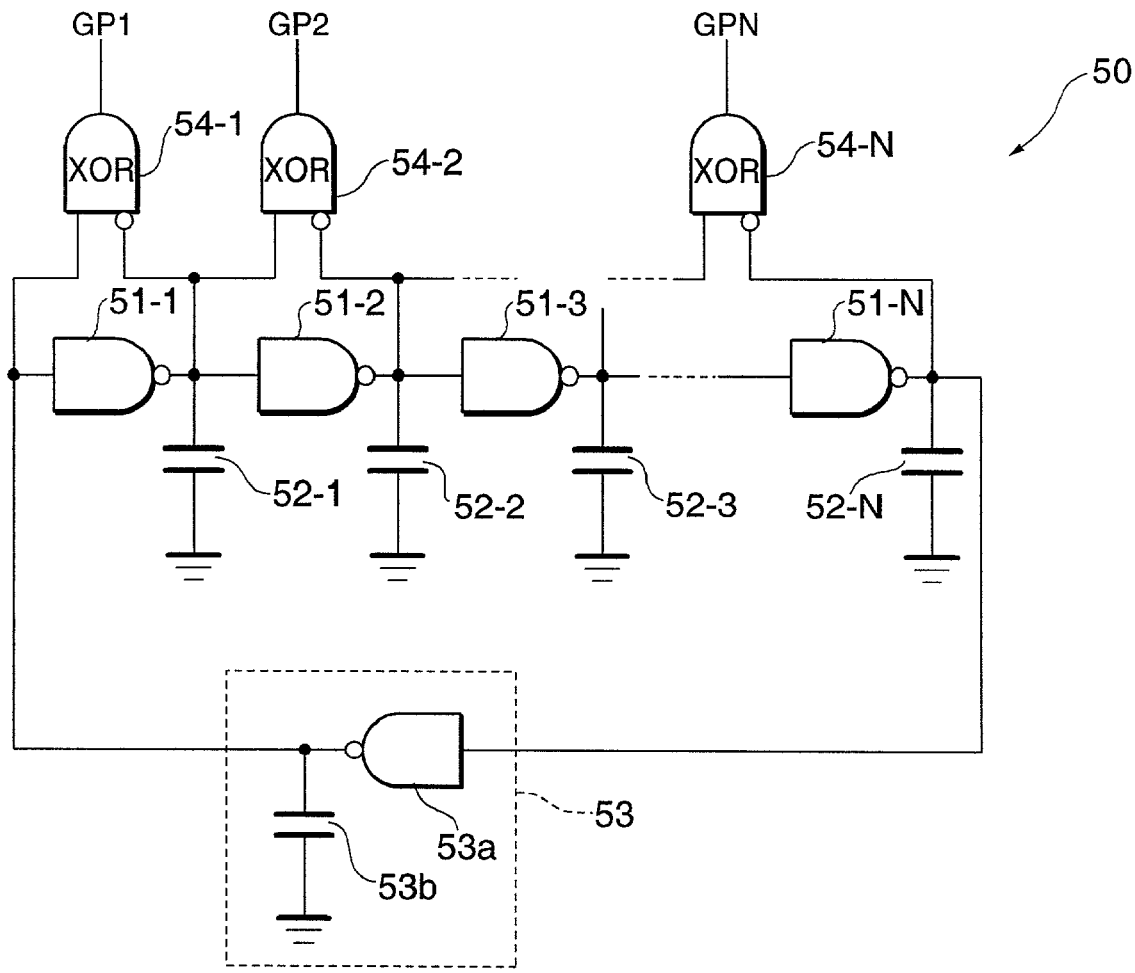
FIG. 2 is a circuit diagram of a high speed pulse generating circuit 50 in FIG. 1.

FIG. 2 is a circuit diagram showing a constructional example of the high speed pulse generating circuit 50 shown in FIG. 1.

The high speed pulse generating circuit 50 has a ring oscillator in which inverters 51-1 to 51-N of an odd number are connected like a ring. When the number of devices 30-1 to 30-N is equal to an even number, a phase adjusting circuit 53 is always necessary for self-advancing oscillation. The phase adjusting circuit 53 is constructed by an inverter 53$a$ for signal inversion having a signal delaying function and a capacitor 53$b$ for signal delay. The phase adjusting circuit 53 is also used for adjusting an oscillating frequency of the ring oscillator. Capacitors 52-1 to 52-N for signal delay are added to output sides of the inverters 51-1 to 51-N constructing the ring oscillator, thereby preventing the oscillating frequency from being wastefully raised.

2-input exclusive OR (hereinafter, abbreviated to "XOR") gates 54-1 to 54-N using a time delay corresponding to one stage of the inverter are connected between input and output sides of the inverters 51-1 to 51-N, thereby allowing the high speed use grant pulses GP1 to GPN to be formed and outputted, respectively. That is, the use grant pulses GP1 to GPN having the time width of one stage of the inverter are generated by the XOR gates 54-1 to 54-N. To assure the necessary sufficient pulse width for the use grant pulses GP1 to GPN, it is preferable to provide a plurality of stages of the inverters 51-1 to 51-N and get the XOR among them.

FIG. 2 shows the simplest specific example of one stage of the inverter. It is desirable to form the use grant pulses GP1 to GPN having the delay time of a plurality of stages also for the purpose of shaping a waveform. The capacitors 52-1 to 52-N operate lest the pulse width of each of the use grant pulses GP1 to GPN is much narrowed, so that the oscillating frequency of the ring oscillator is also determined. Therefore, they are important elements for deciding a speed of the bus arbiter 40 or the band width.

Figure 3:
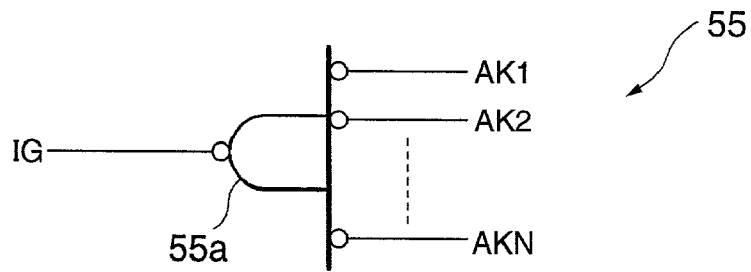
FIG. 3 is a circuit diagram of a use grant inhibiting circuit 55 in FIG. 1.

FIG. 3 is a circuit diagram showing a constructional example of the use grant inhibiting circuit 55 in FIG. 1.

For example, the use grant inhibiting circuit 55 is constructed by a multiinput OR gate 55*a* for receiving the bus use acknowledgment signals AK1 to AKN, getting the OR of them, and outputting it as an inhibition signal IG. By providing the multiinput OR gate 55*a*, when one of the devices (for example, 30-1) starts to use the external bus 33, the output of the bus grant signals GR2 to GRN to other devices 30-2 to 30-N except for the device 30-1 is inhibited by the NAND gates 62-1 to 62-N.

(2) Operation

FIG. 4 is a timing chart showing the operation of the high speed pulse generating circuit 50 in FIG. 2.

In the high speed pulse generating circuit 50 in FIG. 2, output signals of the inverters 51-N, 51-1, 51-2, . . . are sequentially raised to the "H" level at timings t1, t2, t3, . . . which are delayed for the time corresponding to one stage of the inverter, respectively. Thus, the exclusive ORs of the inputs and outputs of the inverters 51-1 to 51-N are obtained by the XOR gates 54-1 to 54-N, respectively. Thus, the high speed use grant pulses GP1, GP2, . . . are outputted from the XOR gates 54-1 to 54-N at timings t1, t2, . . . , respectively.

Figure 5A:
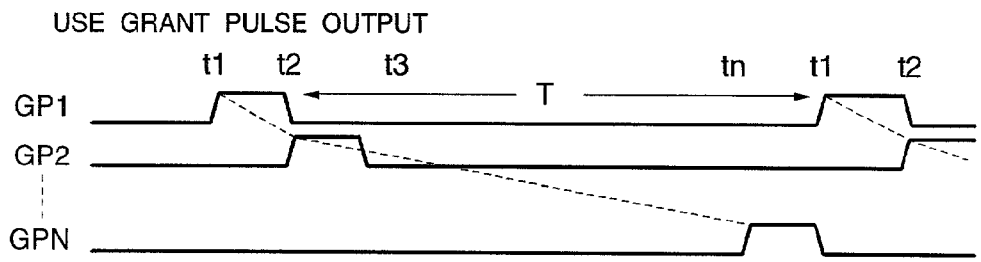
FIGS. 5A to 5D are timing charts showing the operation of the system of FIG. 1.
Figure 5B:
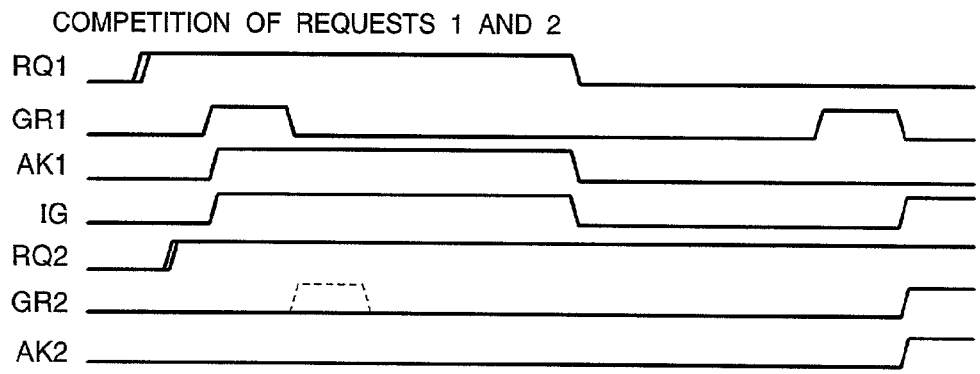
Figure 5C:
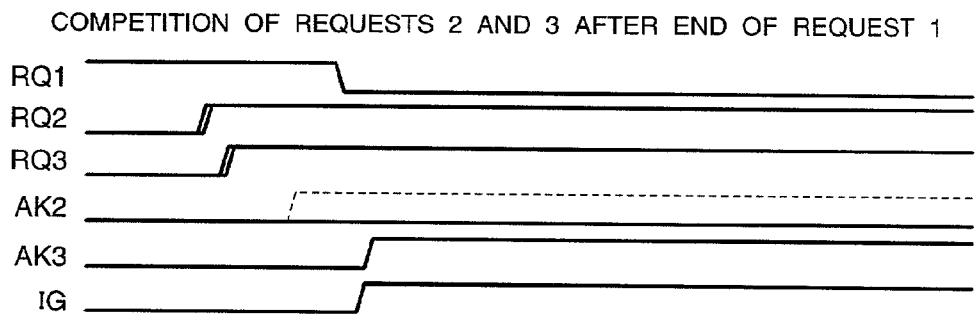
Figure 5D:
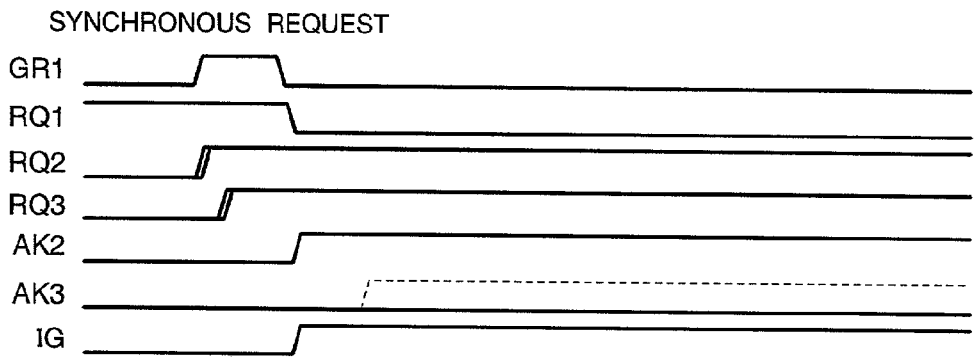

FIGS. 5A to 5D are timing charts showing the operation of the competition arbitration system of FIG. 1. FIG. 5A is the timing chart for the use grant pulse output. FIG. 5B is the timing chart obtained in the case where a request 1 of the device 30-1 and a request 2 of the device 30-2 compete. FIG. 5C is the timing chart obtained in the case where the request 2 of the device 30-2 and a request 3 of the device 30-3 after the end of the request 1 of the device 30-1. FIG. 5D is the timing chart of a synchronous request.

The operation in FIGS. 5A to 5D will now be described hereinbelow.

(A) Use Grant Pulse Output

The timings for the high speed use grant pulses GP1 to GPN which are generated by the high speed pulse generating circuit 50 are the same as those for the bus grant signals GR1 to GRN unless otherwise they are blocked by the AND gates 61-1 to 61-N and 63-1 to 63-N. For example, in case of the bus grant signal GR1 which is inputted to the device 30-1, its foundation is the generated use grant pulse GP1, and this pulse starts at timing t1 and ends at timing t2. For the last device 30-N, the use grant pulse GPN starts at timing tn and ends at timing t1. That is, the operation of the high speed pulse generating circuit 50 is repeated at a period T and the circuit 50 sequentially outputs the use grant pulses GP1 to GPN of a predetermined pulse width to the devices 30-1 to 30-N.

(B) Competition of the Requests 1 and 2

For example, when the device 30-1 outputs the bus request signal RQ1 (request 1) at timing before t1 and the device 30-2 subsequently outputs the bus request signal RQ2 (request 2), both requests 1 and 2 compete. Therefore, they are processed as follows.

When the bus arbiter 40 outputs the bus grant signal GR1 which grants the use of the external bus 33 to the device 30-1 at timing t1, the bus master 32-1 of the device 30-1 outputs the bus use acknowledgment signal AK1 as a response to it. By receiving the bus use acknowledgment signal AK1, the use grant inhibiting circuit 55 outputs the inhibition signal IG which inhibits the use of other devices 30-2 to 30-N. Therefore, the bus grant signal GR2 of the device 30-2 is not outputted as shown by a broken line in the diagram. Thus, the device 30-1 assures the use right of the external bus 33. After that, until the bus request signal RQ1 is trailed to the "L" level in order to withdraw the use request for the external bus 33, the inhibition signal IG which inhibits the use of other devices 30-2 to 30-N is not trailed to the "L" level. The bus use requests by other devices 30-2 to 30-N are reserved.

When the bus use right is withdrawn by the device 30-1, that is, when the transmission and reception of the token are performed, if the device 30-2 is continuously outputting the bus request signal RQ2, the device 30-2 receives the token at timing t2 in the next period T subsequent to the device 30-1 and can assure the use right of the external bus 33. That is, the bus grant signal GR1 of the device 30-1 is not outputted.

Even if the bus request signal RQ2 is outputted earlier than the bus request signal RQ1 in the period T, the use right is more preferentially given to the device 30-1 than the device 30-2. When the bus request signals RQ1, RQ2, . . . are generated for the period of time during which the use grant pulses GP1, GP2, . . . are held at the "H" level, there is a risk that the bus grant signals GR1, GR2, . . . become mustache-like pulses. However, as a countermeasure against such a problem, for example, it is possible to erase them by providing filters in the bus masters 32-1 to 32-N.

(C) Competition of the Requests 2 and 3 After the End of the Request 1

A method of handling the token at the end of the bus request signal RQ1 (request 1) (for example, a method of selecting which one of the devices 30-2 and 30-3 is selected when the device 30-1 withdraws the use right of the external bus 33 and transfers the token to the next device 30-2 or 30-3) is shown here.

For example, when the device 30-1 has the token, if both of the devices 30-2 and 30-3 issue the bus request signals RQ2 and RQ3 (requests 2 and 3) and these bus request signals compete with each other, they will be processed as follows.

If the bus request signal RQ2 (request 2) by the device 30-2 is issued at timing before timing t2, the device 30-2 will get the token without a problem. However, if the device 30-1 withdraws the use right of the external bus 33 at timing just before timing t3, the device 30-3 obtains the token. That is, the bus use acknowledgment signal AK3 by the device 30-3 is outputted. In response to the bus use acknowledgment signal AK3, the use grant inhibiting circuit 55 outputs the inhibition signal IG which inhibits the use of other devices 30-1, 30-2, 30-4, . . . , and 30-N. Now, considering the case where the device 30-2 has already issued the bus request signal RQ2 (request 2), equivalence of the opportunities of the bus use is eventually broken. There is a synchronous request shown in FIG. 5D, which will be explained hereinbelow, as a countermeasure for solving such a problem.

(D) Synchronous Request

In the synchronous request, the holding of the token is certainly performed on a period T unit basis of the use grant pulses GP1 to GPN. Specifically speaking, the bus request signal RQ1 (request 1) of the device 30-1 is finished synchronously with the trailing to the "L" level of the use grant pulse GP1, and the bus master 32-1 of the device 30-1 controls such synchronization. Thus, unlike the case of FIG. 5C, the bus request signals RQ1 to RQN (requests 1 to N) are certainly sequentially checked in the direction from the device 30-1 to the device 30-N. The token is transferred to the device 30-2 as a next device. The bus use acknowledgment signal AK2 of the device 30-2 is outputted at timing t2, so that the bus use acknowledgment signal AK3 of the device 30-3 is not outputted. Therefore, the equivalence of the opportunities of the bus use among the devices 30-1 to 30-N can be assured.

(3) Effects

According to the first embodiment, the following effects (a) to (c) and the like are obtained.

Figure 8:
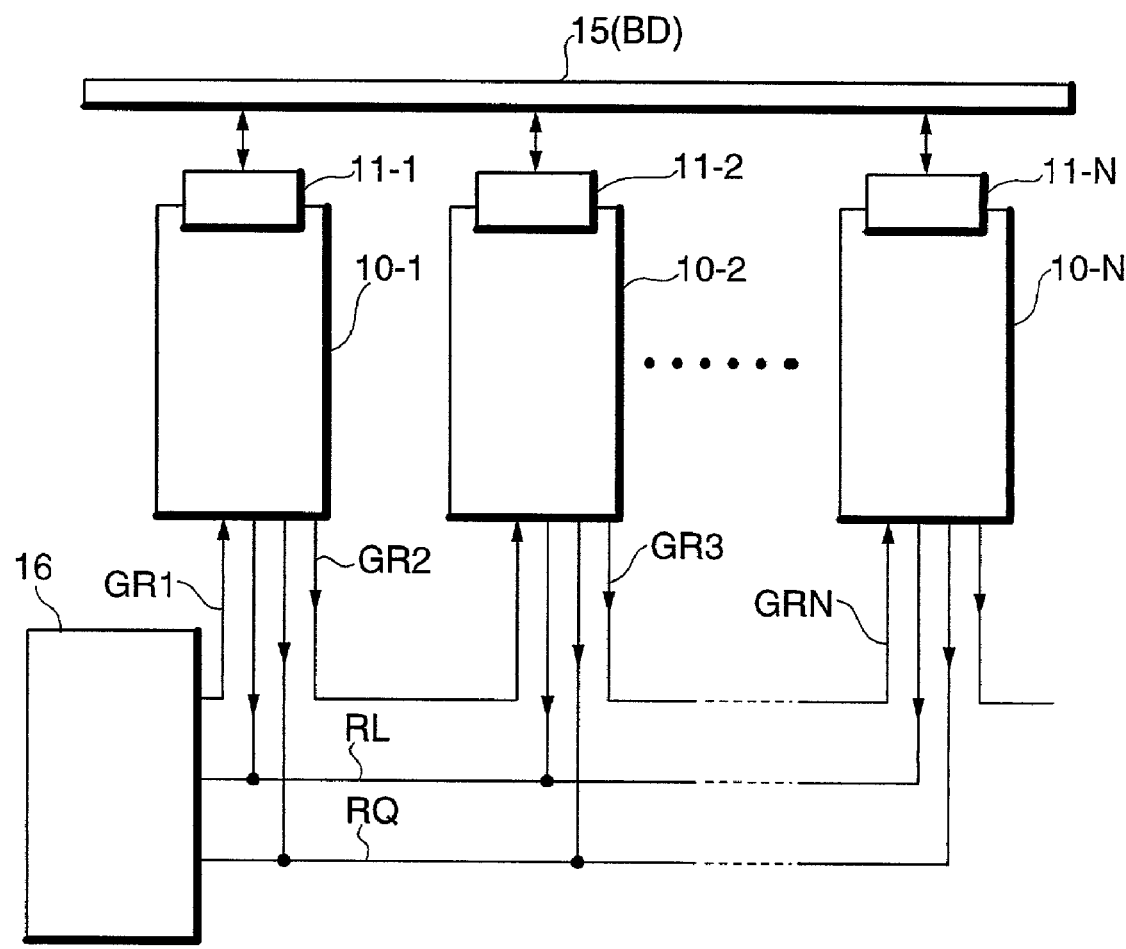
FIG. 8 is a constructional diagram of a conventional daisy-chain competition arbitration system.
Figure 9:
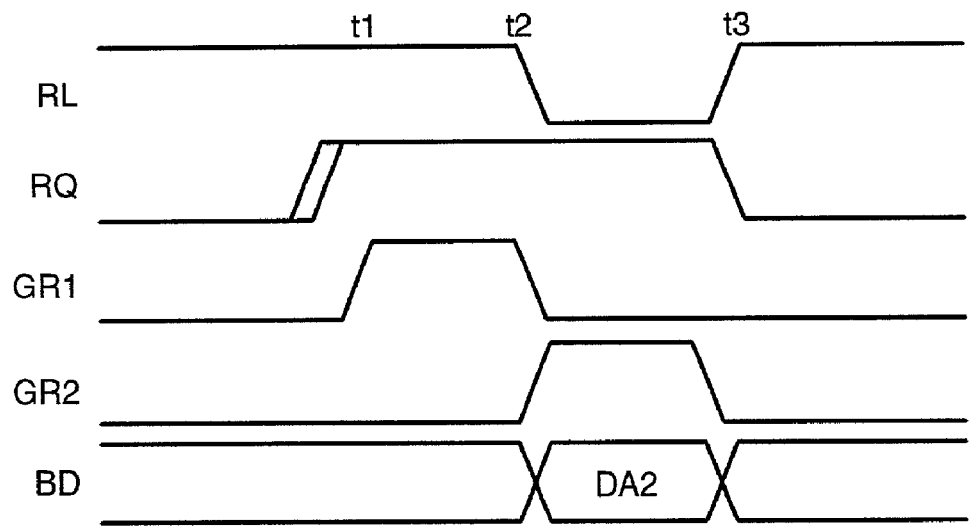
FIG. 9 is a timing chart showing the operation of the system of FIG. 8.
Figure 10:
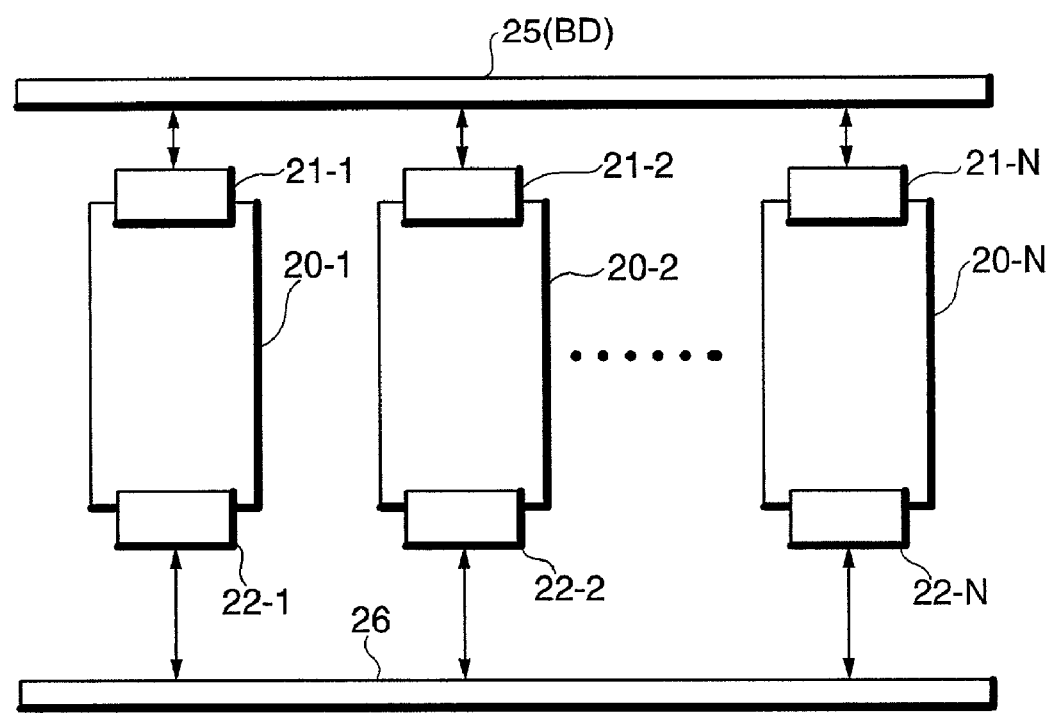
FIG. 10 is a constructional diagram of a conventional distributed competition arbitration system.

(a) Since the conventional daisy-chain competition arbitration system of FIG. 8 uses the arbitration system such that the token is sequentially transferred in the direction from the device 10-1 to the device 10-N, the delay time which is caused when the token passes through the devices 10-1 to 10-N cannot be ignored.

On the other hand, since the embodiment is characterized by using the bus arbiter 40 having the high speed pulse generating circuit 50, it can be regarded that the token does not exist on the devices 30-1 to 30-N but circulates in the high speed pulse generating circuit 50. That is, there is an advantage such that owing to the high speed use grant pulses GP1 to GPN which are generated from the high speed pulse generating circuit 50, the requests from the devices 30-1 to 30-N which output the bus request signals RQ1 to RQN (requests 1 to N) can be promptly accepted. The arbitration system according to the embodiment is a novel system which has not been proposed hitherto. Therefore, equivalence of the opportunities of the bus use among the devices 30-1 to 30-N can be assured and the arbitration of the external bus 33 can be performed at a high speed.

(b) As described in the above item (a), although equivalence of the opportunities of the bus use is assured, a risk that the low speed device (a certain one of the devices 30-1 to 30-N) continuously and indefinitely occupies the external bus 33 still remains in a manner similar to the conventional daisy-chain arbitration system of FIG. 8. As a countermeasure against such a risk, it is desirable to introduce a concept of priority or release the token in a predetermined time. Such a construction will be explained in the following second embodiment.

(c) If the bus masters 32-1 to 32-N for realizing the synchronous request are used, the token is certainly sequentially transferred in the direction from the device 30-1 to the device 30-N, so that the equivalence of the opportunities of the bus use among the devices 30-1 to 30-N can be assured.

(Second Embodiment)

(1) Construction

Figure 6:
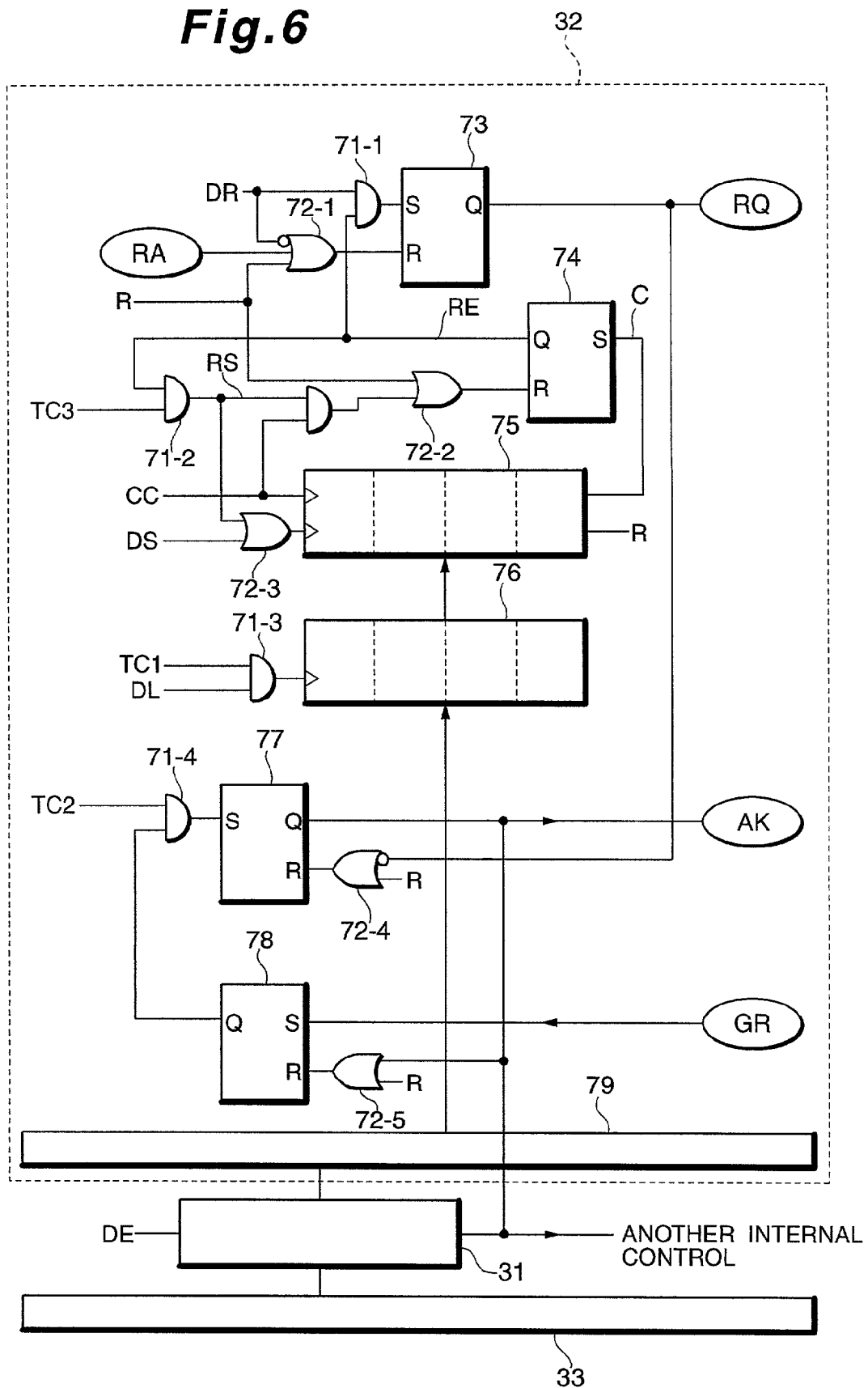
FIG. 6 is a constructional diagram of a device having a bus master with a priority according to the second embodiment of the invention.

FIG. 6 is a constructional diagram of an example of a device having a bus master with a priority in a competition arbitration system showing the second embodiment of the invention. In FIG. 6, component elements common to those in FIG. 1 showing the first embodiment are designated by the same reference numerals.

The devices each having the bus master with the priority are provided in place of, for example, the devices 30-1 to 30-N in FIG. 1. Each of those devices has: a bus interface 31 connected to the external bus 33 in FIG. 1; a bus master 32 connected to the bus arbiter 40; and a device main body.

The bus master 32 has: 2-input AND gates 71-1 to 71-4; 2-input OR gates 72-1 to 72-5; a reset register 73; a request enable register. 74 comprising a flip-flop; a priority counter 75 and a priority register 76 constructing a priority determining circuit; an acknowledge register 77 for use acknowledgment; a grant register 78 for use grant; an internal bus 79; and the like. The internal bus 79 is connected to the external bus 33 via the bus interface 31 which is made operative by a device enable signal DE.

Figure 7:
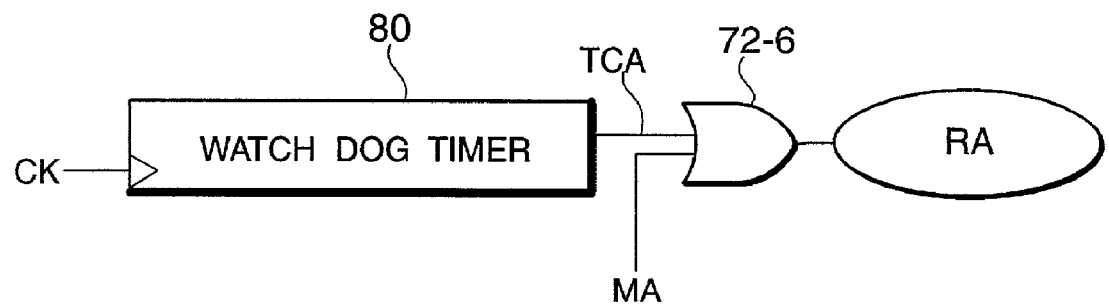
FIG. 7 is a constructional diagram of a bus occupation cancelling circuit which is added to the device of FIG. 6.

FIG. 7 is a constructional diagram showing an example of a bus occupation canceling circuit which is added to the device in FIG. 6.

The bus occupation canceling circuit is constructed by a watch dog timer 80 and a 2-input OR gate 72-6.

(2) Operation

The device in FIGS. 6 and 7 introducing the priority operates as follows.

The operation such that when the device main body requests the use of the external bus 33 and outputs a device request signal DR, the request register 73 is set and the bus request signal RQ is immediately issued is not performed. In the AND gate 71-1, unless a request enable signal RE is issued from an output terminal Q of the request enable register. 74, the reset register 73 is not set. This is because the priority is introduced into the device. In this case, the priority is determined by data in the priority register 76 as a first register. The data in the priority register 76 is inputted into the priority register 76 by a data latch signal DL via the internal bus 79 by a timing clock TC1.

Subsequently, the data inputted into the priority register 76 is set to the priority counter 75 by a data set signal DS. When a count value of the priority counter 75 is incremented by a counter clock signal CC and a carry signal C as a signal for taking a figure up one place is outputted, the request enable register. 74 is set. Thus, the request enable signal RE is outputted from the request enable register. 74, the AND gate 71-1 is opened, the reset register 73 as a second register is set, the bus request signal RQ is outputted, and to the bus arbiter 40 in FIG. 1 can recognize the request.

After the request enable signal RE is once issued from the output terminal Q of the request enable register. 74, a restart signal RS is set to the high level by the AND gate 71-2 by a timing clock TC3, the request enable register. 74 is reset via the OR gate 72-2, and the priority counter 75 is reset via the OR gate 72-3. The request enable signal RE which is outputted from the request enable register. 74 is validated only for a period of time during which the carry signal C of the priority counter 75 is issued. When a data amount in the priority counter 75 is large, the request enable signal RE is often outputted. This means that the priority of the device is high. In this embodiment, a RS-latch like the request enable register. 74 is composed with the reset signal of being prior to the set signal.

When the device in FIG. 6 outputs the bus request signal RQ and requests to occupy the external bus 33, the bus arbiter 40 in FIG. 1 recognizes it and outputs a bus grant signal GR, so that the grant register 78 is set. A signal which is outputted from the output terminal Q of the grant register 78 sets the acknowledge register 77 by the AND gate 71-4 by a timing clock TC2, so that it is possible to respond to the bus arbiter 40 in FIG. 1 by a bus use acknowledgment signal AK. This means that by receiving the bus grant signal GR of the device in FIG. 6, the device starts to occupy the external bus 33. The bus use acknowledgment signal AK which is outputted from the acknowledge register 77 couples the internal bus 79 with the external bus 33 via the bus interface 31 and is also used for other controls in the device.

For example, when a central processing unit (hereinafter, abbreviated to "CPU") (not shown) connected to the external bus 33 intends to access the device in FIG. 6, the access is made to the bus interface 31 by the device enable signal DE. Such an access is made in the case where the CPU (not shown) connected to the external bus 33 writes the priority into the priority register 76 in order to directly designate the priority of the device in FIG. 6, or the like.

When the device in FIG. 6 finishes the occupation of the external bus 33 and the device main body withdraws the device request signal DR or sets a request abort signal RA to the high level, the reset register 73 is reset via the OR gate 72-1. Thus, the bus request signal RQ trails and the acknowledge register 77 is reset via the OR gate 72-4. Therefore, the bus use acknowledgment signal AK trails forcedly to the low level and the opportunity of occupying the external bus 33 is given to other devices.

Although the bus grant signal GR which is sent from the bus arbiter 40 in FIG. 1 is a signal which gives the use grant to the device in FIG. 6, since it is inputted by the pulse, the grant register 78 for receiving it is necessary. However, the device starts to occupy the external bus 33 and after the bus use acknowledgment signal AK is outputted from the acknowledge register 77, if the grant register 78 is held in the set state, the bus grant signal GR trails and it is seen as if there were the grant even after the bus arbiter 40 in FIG. 1 cancels the use grant of the external bus 33. Therefore, the bus use acknowledgment signal AK is previously detected in the OR gate 72-5 and the grant register 78 is reset.

In case of the device having the bus master 32 with the priority in FIG. 6, the occupation of the external bus 33 by the low speed device cannot be cancelled in this state. The request abort signal RA which is outputted from the device main body is a signal for voluntarily withdrawing the occupation of the external bus 33. Therefore, as shown in FIG. 7, the watch dog timer 80 is provided in the device. The watch dog timer 80 counts the number of clocks CK. When the device is operating normally for a predetermined time, the watch dog timer 80 is set and a timer carry signal TCA is not outputted. If an abnormality occurs in the device, the watch dog timer 80 is not reset even after the elapse of the predetermined time or longer, so that an overflow occurs and the timer carry signal TCA is outputted. The OR of the timer carry signal TCA and a manual abort signal NU is got by the OR gate 72-6 and the request abort signal RA is outputted.

By providing the watch dog timer 80, the external bus 33 can be withdrawn in a predetermined time. If such a time is shortened, it is substantially equivalent to a reduction of the priority of the device in FIG. 6.

(3) Effect

According to the second embodiment, it is possible to prevent the external bus 33 from being occupied by the device of the low priority (for example, low speed device) forever. The request from the device of the high priority can be satisfied.

(Modifications)

The invention is not limited to the foregoing embodiments but many variations and modifications are possible. For example, there are the following variations and modifications (i) to (iii).

(i) The high speed pulse generating circuit 50 and use grant inhibiting circuit 55 in FIG. 1 can be also constructed by circuits other than those shown in FIGS. 2 and 3. The gate circuits 60-1 to 60-N can be also constructed by gates or the like other than those shown in the diagrams.

(ii) The devices having the bus masters with the priorities shown in FIGS. 6 and 7 can be also constructed by circuits other than those shown in the diagrams.

(iii) Although the competition arbitration system of the embodiment has been described with respect to the arbitration system regarding the use right of the external bus 33, the invention can be widely applied to distribution of a resource other than the external bus 33 of the computer.

As described in detail above, according to the invention, since the bus arbiter having the pulse generating means is provided, it is possible to presume that the token does not exist on the device but is circulating, for example, in the pulse generating means for generating the high speed pulse. Therefore, the use request signal from the device which outputted the use request signal can be allowed to be promptly accepted by the high speed pulse generated from the pulse generating means. The equivalence of the opportunities among the devices is guaranteed. The arbitration of the resource of the computer such as a bus and the like can be performed at a high speed.

According to the invention, by providing the control means for realizing the synchronous request, the token is certainly transferred in order of the devices and the equivalence of the opportunities among the devices can be more certainly guaranteed.

The present invention is not limited to the foregoing embodiments but many modifications and variations are possible within the spirit and scope of the appended claims of the invention.

What is claimed is:

1. A competition arbitration system comprising:
   a predetermined resource (bus 33);
   N devices (30-1, . . . , 30-N) to competitively use the predetermined resource;
   an arbitrating apparatus (40) for arbitrating the N devices to use the predetermined resource; and
   N control means (bus masters 32) that are associated respectively with the N devices;
   (a) wherein the arbitrating apparatus includes
   N gate circuits (60-1, . . . , 60-N) that are associated respectively with the N devices,
   a pulse generating circuit (50) which generates, during a period (T), N pulses (grant pulse GP-1, . . . , GP-N) corresponding respectively to the N devices, and sequentially outputs the N pulses to respective ones of the N gate circuits, and
   an inhibiting circuit (55) which, while any one of the N devices is using the predetermined resource, inhibits others of the devices, not using the predetermined resource, from acquiring the predetermined resource for use;
   (b) wherein each control means outputs a request signal (RQ) to a corresponding one of the gate circuits when one of the devices corresponding thereto needs to use the predetermined resource; receives a grant signal (GR-i, i=1, . . . ,N) from the corresponding gate circuit for controlling the corresponding device to use the predetermined resource; and outputs an acknowledgment signal (AK-i, i=1, . . . , N) to the inhibiting circuit during a time interval in which the corresponding device uses the predetermined resource; and (c) wherein, the inhibiting circuit, while receiving the acknowledgment signal (AK-i) from any of the control means, outputs an inhibition signal (IG) to all of the gate circuits, and each gate circuit, when simultaneously receiving the corresponding request signal (RQ) outputted from the corresponding control means and the corresponding pulses (GP) outputted from the pulse generating circuit but not receiving the inhibition signal (IG), outputs the corresponding grant signal (GR-i, i=1, . . . , N) to the control means; and (d) wherein the system does not use fixed priorities.

2. The competition arbitration system according to claim 1, comprising an inverter, and wherein each gate circuit includes a first AND gate (61-i, i=1, . . . , N) to receive the corresponding request signal (RQ) and to receive the corresponding pulses (GP); a NAND gate (62-i, i=1, . . . , N) to receive the inhibition signal (IG) and to receive the corresponding acknowledgment signal (AK-i) via the inverter; and a second AND gate (63-i, i=1, . . . , N) to receive an output of the first AND gate and to receive output of the NAND gate, and to output the corresponding grant signal (GR).

3. The competition arbitration system according to claim 1, wherein the control means ends the request signal (RQ) synchronously with the end of the corresponding pulse (GP).

4. The competition arbitration system according to claim 1, wherein the inhibiting circuit comprises a single inhibiting circuit operatively coupled to each of the devices and each of the gate circuits;

wherein the inhibition signal from the grant inhibiting circuit to all of the gate circuits is a common inhibition signal; and wherein each gate circuit outputs the grant signal when the request signal and the inhibition signal have a specific logical truth-value relationship corresponding to the case that the gate circuit is receiving a request signal but is not receiving the inhibition signal.

5. The competition arbitration system according to claim 4, wherein each gate circuit accepts a respective pulse, each gate circuit outputs the grant signal only while receiving the pulse, and the competition arbitration system further comprises a pulse generator which outputs the pulse to exactly one gate circuit at a time, whereby no two gate circuits simultaneously output the grant signal.

6. The competition arbitration system according to claim 5, wherein the pulse is outputted sequentially to each of the gate circuits.

7. The competition arbitration system according to claim 6, wherein the pulses generator comprises a pulse generator, the pulse generator comprises a ring oscillator, and the pulse comprises a use-grant pulse formed by a logic circuit from an output of the ring oscillator.

8. The competition arbitration system according to claim 6, wherein the predetermined resource of the computer comprises a bus.

9. The competition arbitration system according to claim 6, wherein each gate circuit outputs the request signal synchronously with receiving the pulse, thereby allowing use requests from the devices to be granted in an order of the devices.

10. The competition arbitration system according to claim 5, where the pulse is outputted to the gate circuit of a one of the devices to which use of the predetermined resource is granted, and the pulse to the gate circuit of the devices to which the use of the predetermined resource is not granted is shut off, thereby stopping output of the pulse.

11. The competition arbitration system according to claim 10, wherein the gate circuit of each of the devices includes a priority determining circuit which determines a priority about the use of the predetermined resource of each of the devices.

12. The competition arbitration system according to claim 11, wherein the priority determining circuit includes a first register which stores data indicative of the priority and outputs the request signal to the competition arbitration system on the basis of the data stored in the first register.

13. The competition arbitration system according to claim 12, wherein the priority determining circuit further includes:

a counter which receives the data indicative of the priority from the first register and outputs a carry signal according to the data;

a request enable register which outputs a request enable signal in response to the carry signal from the counter; and a second register which outputs the request signal to the competition arbitration system when the request enable signal and the request signal from the device are received.

14. The competition arbitration system according to claim 11, wherein the gate circuit further includes an occupation canceling circuit which prevents the predetermined resource from being occupied by the device.

15. The competition arbitration system according to claim 14, wherein the occupation canceling circuit includes a watch dog timer which outputs an abort signal for canceling the occupation after the elapse of a predetermined time.

16. The competition arbitration system according to claim 4, wherein the inhibiting circuit comprises a multi-input OR gate.

17. The competition arbitration system according to claim 4, wherein the competition arbitration system includes no processor and executes no program.

18. The competition arbitration system according to claim 4, wherein the predetermined resource of the computer comprises a bus.

19. The competition arbitration system according to claim 4, wherein, once a certain device occupies the predetermined resource, although the grant signals are not outputted to other ones of the devices, the grant signal is still continuously outputted to the certain device.

* * * * *